United States Patent
Kim et al.

(10) Patent No.: US 9,021,609 B2
(45) Date of Patent: Apr. 28, 2015

(54) APPARATUS AND METHOD FOR VERIFYING INTEGRITY OF FIRMWARE OF EMBEDDED SYSTEM

(71) Applicant: Electronics and Telecommunications Research Institute, Daejeon (KR)

(72) Inventors: Hyo-Won Kim, Daejeon (KR); Jung-Hyung Park, Daejeon (KR); Jae-Woo Han, Daejeon (KR); Dae-Seon Park, Daejeon (KR); Hye-Ryoun Chung, Daejeon (KR); Jin-Ha Hwang, Daejeon (KR); Bon-Seok Koo, Daejeon (KR); Sang-Woo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 26 days.

(21) Appl. No.: 13/941,520

(22) Filed: Jul. 14, 2013

(65) Prior Publication Data
US 2014/0157427 A1   Jun. 5, 2014

(30) Foreign Application Priority Data
Nov. 30, 2012   (KR) .......................... 10-2012-0138417

(51) Int. Cl.
*G06F 21/64* (2013.01)
*G06F 21/57* (2013.01)

(52) U.S. Cl.
CPC ............ *G06F 21/572* (2013.01); *G06F 21/645* (2013.01)

(58) Field of Classification Search
None
See application file for complete search history.

(56) References Cited

U.S. PATENT DOCUMENTS

| 2003/0009687 A1* | 1/2003 | Ferchau et al. ............... 713/200 |
| 2003/0217358 A1* | 11/2003 | Thurston et al. ............. 717/174 |
| 2005/0059352 A1 | 3/2005 | McLean |
| 2006/0101310 A1* | 5/2006 | Diamant et al. ................ 714/38 |

FOREIGN PATENT DOCUMENTS

| KR | 10-2006-0119967 A | 11/2006 |
| KR | 10-0750477 B1 | 8/2007 |
| KR | 10-2008-0023841 A | 3/2008 |

OTHER PUBLICATIONS

Arvind Seshadri et al., "SWATT: SoftWare-based ATTestation for Embedded Devices," IEEE Symposium on Security and Privacy, 2004.

* cited by examiner

*Primary Examiner* — David Pearson
(74) *Attorney, Agent, or Firm* — LRK Patent Law Firm

(57) ABSTRACT

An apparatus and method for verifying the integrity of firmware of an embedded system is provided. The apparatus for verifying the integrity of firmware of an embedded system includes a target integrity code obtainment unit for obtaining a target integrity code of firmware of the embedded system. A source integrity code obtainment unit obtains a source integrity code of source firmware. An integrity determination unit determines whether integrity of the firmware of the embedded system is maintained, by using the target integrity code and the source integrity code.

14 Claims, 2 Drawing Sheets

APPARATUS AND METHOD FOR VERIFYING INTEGRITY OF FIRMWARE OF EMBEDDED SYSTEM

CROSS REFERENCE TO RELATED APPLICATION

This application claims the benefit of Korean Patent Application No. 10-2012-0138417, filed on Nov. 30, 2012, which is hereby incorporated by reference in its entirety into this application.

BACKGROUND OF THE INVENTION

1. Technical Field

The present invention relates generally to the verification of the integrity of firmware of an embedded system and, more particularly, to an apparatus and method for verifying the integrity of firmware of an embedded system based on the comparison of integrity codes.

2. Description of the Related Art

Damage from the hacking of an Operating System (OS) is an increasingly common problem. Even in the case of an embedded system, damage from firmware forgery may be caused, similarly to the hacking of the OS. In particular, if, among embedded systems, network components, such as a router, a switch, a printer, and a scanner, are targeted by firmware forgery, damage as serious as that which results from the hacking of the OS may be caused.

Generally, an apparatus for verifying the integrity of firmware of an embedded system is configured in a server-client structure, and is problematic in that forgery may occur during a procedure for receiving a program from a server.

Korean Patent Application Publication No. 2006-0119967 discloses technology for storing an integrity verification program from a server in an embedded system that is a client, receiving a response from the integrity verification program, and then verifying integrity.

However, the above conventional technology merely presents technology for simply receiving a response from the integrity verification program, and neither discloses nor suggests a detailed configuration for comparing the integrity code of the firmware of the embedded system with the integrity code of source firmware. Further, the conventional technology presents technology for merely storing the integrity verification program in the embedded system, and neither discloses nor suggests a detailed configuration for storing a program for calculating an integrity code in the execution memory of the embedded system. Furthermore, the conventional technology does not describe a configuration that can be applied even to an embedded system incapable of accessing a network, by utilizing communication interfaces such as a Universal Serial Bus (USB), a Universal Asynchronous Receiver/Transmitter (UART), and the Ethernet.

Therefore, new technology for verifying the integrity of firmware of an embedded system is required which can determine whether the firmware of the embedded system is the latest version and has been forged, by comparing the integrity code of the firmware of the embedded system with the integrity code of source firmware, can solve the problem of program forgery occurring in a server-client structure by storing a program for calculating an integrity code in the execution memory of the embedded system and by utilizing the integrity code calculated by executing the program, and can perform integrity verification even on an embedded system incapable of accessing a network, by utilizing communication interfaces such as a USB, a UART, and the Ethernet.

SUMMARY OF THE INVENTION

Accordingly, the present invention has been made keeping in mind the above problems occurring in the prior art, and an object of the present invention is to enable integrity verification in such a way as to determine whether the firmware of an embedded system is the latest version and has been forged, by comparing the integrity code of the embedded system with the integrity code of source firmware.

Another object of the present invention is to solve the problem of program forgery occurring in a server-client structure and to enable integrity verification with higher security by storing a program for calculating an integrity code in the execution memory of an embedded system and by utilizing the integrity code calculated by executing the program.

A further object of the present invention is to enable integrity verification to be performed even on an embedded system incapable of accessing a network, by utilizing communication interfaces such as a USB, a UART, and the Ethernet.

In accordance with an aspect of the present invention to accomplish the above objects, there is provided an apparatus for verifying integrity of firmware of an embedded system, including a target integrity code obtainment unit for obtaining a target integrity code of firmware of the embedded system; a source integrity code obtainment unit for obtaining a source integrity code of source firmware; and an integrity determination unit for determining whether integrity of the firmware of the embedded system is maintained, by using the target integrity code and the source integrity code.

Preferably, the target integrity code obtainment unit may store a program for calculating an integrity code in execution memory of the embedded system, and obtain the target integrity code calculated by executing the program.

Preferably, the target integrity code obtainment unit may determine whether a checksum of the program is normal and store the program in the execution memory if it is determined that the checksum of the program is normal.

Preferably, the target integrity code obtainment unit may include a communication interface for transmitting an execution signal for the program to the embedded system and receiving the target integrity code from the embedded system.

Preferably, the communication interface may include one or more of a Universal Serial Bus (USB), a Universal Asynchronous Receiver/Transmitter (UART), and an Ethernet.

Preferably, the apparatus may further include a screen display unit for displaying information about whether the integrity of the firmware of the embedded system is maintained on a screen.

Preferably, the target integrity code obtainment unit may include a program database for storing and updating the program, and the source integrity code obtainment unit may include a firmware database for storing and updating the source firmware.

Preferably, the firmware database may store and update the source integrity code of the source firmware.

Preferably, the integrity determination unit may compare the target integrity code with the source integrity code, and determine in different manners whether the integrity is maintained depending on whether the target integrity code is found to be identical to the source integrity code as a result of the comparison.

Preferably, the integrity determination unit may determine that the integrity is maintained if the target integrity code is found to be identical to the source integrity code as a result of the comparison, and determine that the integrity is not maintained if the target integrity code is not found to be identical to the source integrity code as a result of the comparison.

In accordance with another aspect of the present invention to accomplish the above objects, there is provided a method for verifying integrity of firmware of an embedded system, including obtaining a target integrity code of firmware of the embedded system; obtaining a source integrity code of source firmware; and determining whether integrity of the firmware of the embedded system is maintained, by using the target integrity code and the source integrity code.

Preferably, obtaining the target integrity code may be configured to store a program for calculating an integrity code in execution memory of the embedded system, and obtain the target integrity code calculated by executing the program.

Preferably, obtaining the target integrity code may be configured to determine whether a checksum of the program is normal, and store the program in the execution memory if it is determined that the checksum of the program is normal.

Preferably, obtaining the target integrity code may be configured to include a communication interface for transmitting an execution signal for the program to the embedded system and receiving the target integrity code from the embedded system.

Preferably, the communication interface may include one or more of a Universal Serial Bus (USB), a Universal Asynchronous Receiver/Transmitter (UART), and an Ethernet.

Preferably, the method may further include displaying information about whether the integrity of the firmware of the embedded system is maintained on a screen.

Preferably, obtaining the target integrity code may be configured to include a program database for storing and updating the program, and obtaining the source integrity code may be configured to include a firmware database for storing and updating the source firmware.

Preferably, the firmware database may store and update the source integrity code of the source firmware.

Preferably, determining whether the integrity of the firmware of the embedded system is maintained may be configured to compare the target integrity code with the source integrity code, and determine in different manners whether the integrity is maintained depending on whether the target integrity code is found to be identical to the source integrity code as a result of the comparison.

Preferably, determining whether the integrity of the firmware of the embedded system is maintained may be configured to determine that the integrity is maintained if the target integrity code is found to be identical to the source integrity code as a result of the comparison, and determine that the integrity is not maintained if the target integrity code is not found to be identical to the source integrity code as a result of the comparison.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
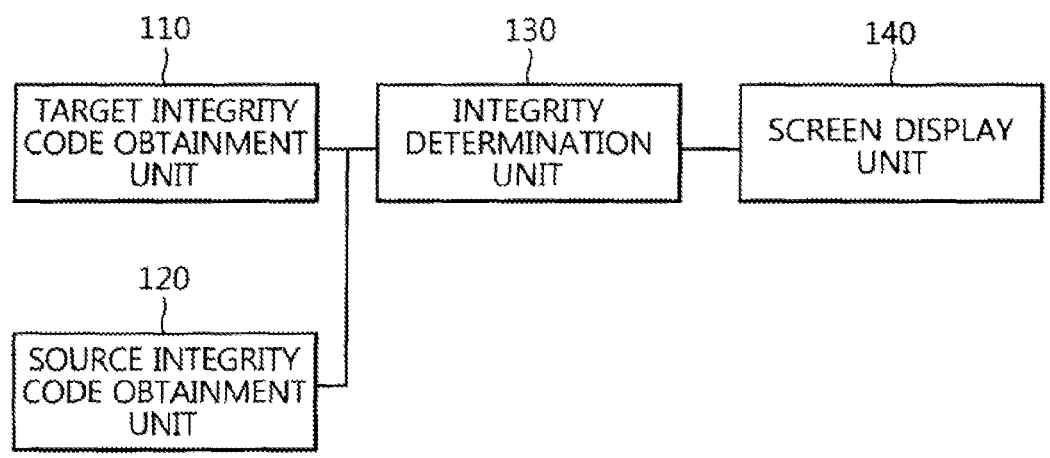
FIG. 1 is a block diagram showing an apparatus for verifying the integrity of firmware of an embedded system according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to Which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a block diagram showing an apparatus for verifying the integrity of firmware of an embedded system according to an embodiment of the present invention.

Referring to FIG. 1, the apparatus for verifying the integrity of firmware of an embedded system 220 (see FIG. 2) according to an embodiment of the present invention includes a target integrity code obtainment unit 110, a source integrity code obtainment unit 120, an integrity determination unit 130, and a screen display unit 140.

The target integrity code obtainment unit 110 obtains the target integrity code of the embedded system 220.

Here, the embedded system 220 denotes any of various systems including firmware, and may include any one of, for example, a camcorder, a scanner, a printer, a router, a facsimile, and a smart device.

The integrity code ma y include a Hash-based Message Authentication Code (HMAC).

The target integrity code obtainment unit 110 may store a program for calculating an integrity code in the execution memory of the embedded system 220, and may obtain a target integrity code calculated by executing the program.

In this case, the target integrity code obtainment unit 110 may determine whether the checksum of the program is normal, and may store the program in the execution memory if it is determined that the checksum of the program is normal.

The checksum may be the sum of all data values of the program.

As described above, the apparatus for verifying the integrity of the firmware of the embedded system 220 according to the embodiment of the present invention stores the program in the execution memory and utilizes the target integrity code calculated by executing the program, thus solving the problem of program forgery occurring in a server-client structure and enabling integrity verification with higher security to be performed.

The target integrity code obtainment unit 110 may include a communication interface 230 (see FIG. 2) for transmitting an execution signal for the program to the embedded system 220 and for receiving the target integrity code from the embedded system 220.

The communication interface 230 may include one or more of a Universal Serial Bus (USB), a Universal Asynchronous Receiver/Transmitter (UART), and the Ethernet.

As described above, the apparatus for verifying the integrity of the firmware of the embedded system 220 according to the embodiment of the present invention can verify the integrity of even an embedded system 220 incapable of accessing the network, by utilizing the communication interface 230.

Further, the target integrity code obtainment unit 110 may include a program database (DB) for storing and updating the program.

The source integrity code obtainment unit 120 obtains the source integrity code of source firmware.

In this case, the source integrity code obtainment unit 120 may include a firmware DB for storing and updating the source firmware.

The firmware DB may store and update the source integrity code of the source firmware.

The integrity determination unit 130 determines whether the integrity of the firmware of the embedded system 220 is maintained, by using the target integrity code and the source integrity code.

In this case, the integrity determination unit 130 may compare the target integrity code with the source integrity code and may determine in different manners whether the integrity is maintained depending on whether the target integrity code is found to be identical to the source integrity code as a result of the comparison.

If the target integrity code is found to be identical to the source integrity code as a result of the comparison, the integrity determination unit 130 may determine that the integrity is maintained, whereas if the target integrity code is not found to be identical to the source integrity code as a result of the comparison, the integrity determination unit 130 may determine that the integrity is not maintained.

As described above, the apparatus for verifying the integrity of the firmware of the embedded system 220 according to the embodiment of the present invention may perform integrity verification in such a way as to determine whether the firmware of the embedded system 220 is the latest version and has been forged, by comparing the target integrity code with the source integrity code.

The screen display unit 140 displays information about whether the integrity of the firmware of the embedded system 220 is maintained on a screen.

Figure 2:
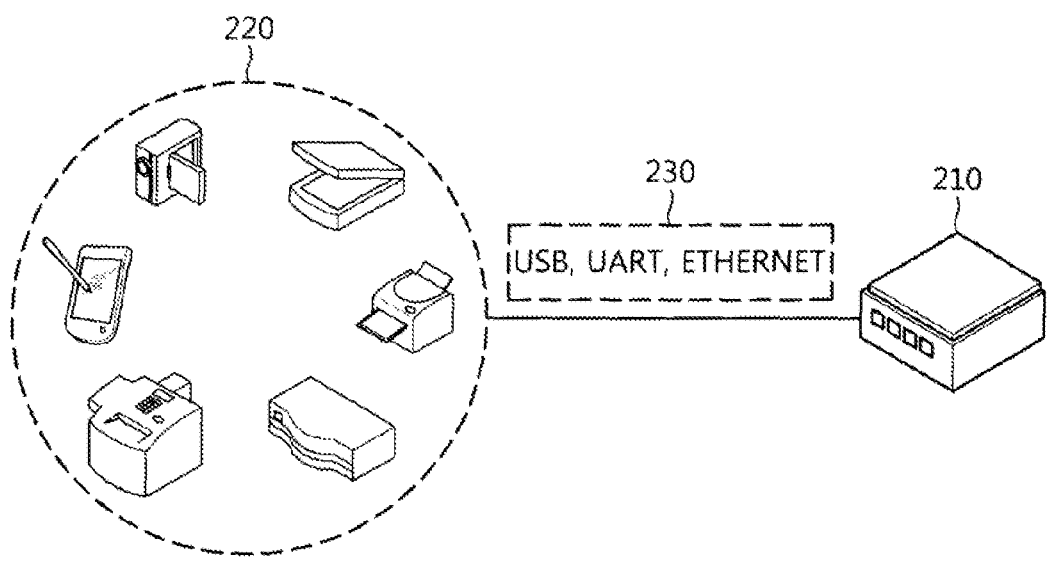
FIG. 2 is a diagram showing an embodiment of a system to which the apparatus for verifying the integrity of firmware of the embedded system according to the present invention is applied.

FIG. 2 is a diagram showing an embodiment of a system to which the apparatus for verifying the integrity of firmware of the embedded system 220 according to the present invention is applied.

Referring to FIG. 2, the system to which the apparatus for verifying the integrity of the firmware of the embedded system 220 according to the present invention is applied includes an external device 210, the embedded system 220, and a communication interface 230.

The external device 210 includes the apparatus for verifying the integrity of the firmware of the embedded system 220 according to the present invention.

The apparatus for verifying the integrity of the firmware of the embedded system 220 according to the present invention may include a target integrity code obtainment unit 110, a source integrity code obtainment unit 120, and an integrity determination unit 130.

The target integrity code obtainment unit 110 obtains the target integrity code of the firmware of the embedded system 220.

The integrity code may include Hash-based Message Authentication Code (HMAC).

In this case, the target integrity code obtainment unit 110 may store a program for calculating an integrity code in the execution memory of the embedded system 220 and may obtain the target integrity code calculated by executing the program.

Further, the target integrity code obtainment unit 110 may determine whether the checksum of the program is normal, and store the program in the execution memory if it is determined that the checksum of the program is normal.

Here, the checksum may be the sum of all data values of the program.

The target integrity code obtainment unit 110 includes the communication interface 230 for transmitting an execution signal for the program to the embedded system 220 and receiving the target integrity code from the embedded system 220.

Further, the target integrity code obtainment unit 110 may include a program DB for storing and updating the program.

The source integrity code obtainment unit 120 obtains the source integrity code of source firmware.

In this case, the source integrity code obtainment unit 120 may include a firmware DB for storing and updating the source firmware.

The firmware DB may store and update the source integrity code of the source firmware.

The integrity determination unit 130 determines whether the integrity of the firmware of the embedded system 220 is maintained, by using the target integrity code and the source integrity code.

In this case, the integrity determination unit 130 may compare the target integrity code with the source integrity code and may determine in different manners whether the integrity is maintained depending on whether the target integrity code is found to be identical to the source integrity code as a result of the comparison.

In detail, if the target integrity code is found to be identical to the source integrity code as a result of the comparison, the integrity determination unit 130 may determine that the integrity is maintained, whereas if the target integrity code is not found to be identical to the source integrity code as a result of the comparison, the integrity determination unit 130 may determine that the integrity is not maintained.

The embedded system 220 denotes any of various systems including firmware, and may include any one of a camcorder, a scanner, a printer, a router, a facsimile, and a smart device.

The communication interface 230 may include one or more of a USB, a UART, and the Ethernet.

As described above, the apparatus for verifying the integrity of the firmware of the embedded system 220 according to the embodiment of the present invention may verify the integrity of an embedded system 220 incapable of accessing the network, by utilizing the communication interface 230.

Figure 3:
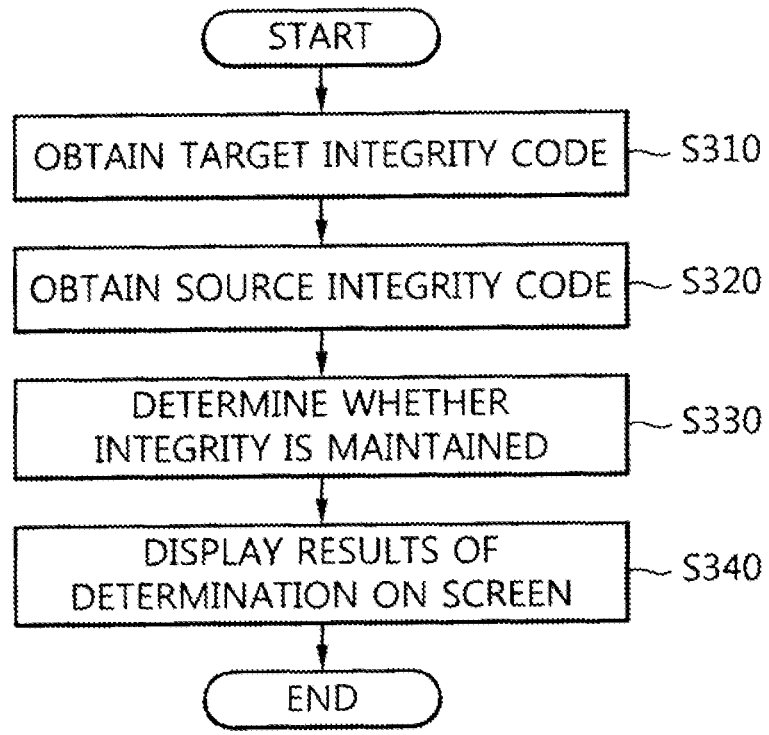
FIG. 3 is an operating flowchart showing a method for verifying the integrity of firmware of an embedded system according to an embodiment of the present invention.

FIG. 3 is an operating flowchart showing a method for verifying the integrity of firmware of the embedded system 220 according to an embodiment of the present invention.

Referring to FIG. 3, in the method for verifying the integrity of the firmware of the embedded system 220 according to an embodiment of the present invention, the target integrity code of the firmware of the embedded system is obtained at step S310.

In this case, the embedded system 220 denotes any of various systems including firmware, and may include any one of, for example, a camcorder, a scanner, a printer, a router, a facsimile, and a smart device.

The integrity code may include a Hash-based Message Authentication Code (HMAC).

In this case, step S310 may be configured to store a program for calculating an integrity code in the execution memory of the embedded system 220, and obtain the target integrity code calculated by executing the program.

Here, step S310 may be configured to determine whether the checksum of the program is normal, and store the program in the execution memory if the checksum of the program is normal.

The checksum may be the sum of all data values of the program.

As described above, the method for verifying the integrity of the firmware of the embedded system 220 according to the embodiment of the present invention may store the program in the execution memory, and utilize the target integrity code calculated by executing the program, thus solving the problem of program forgery occurring in a server-client structure and enabling integrity verification with higher security to be performed.

Further, step S310 may be configured to include a communication interface 230 for transmitting an execution signal for the program to the embedded system 220 and receiving the target integrity code from the embedded system 220.

Here, the communication interface 230 may include one or more of a USB, a UART, and the Ethernet.

In this way, the method for verifying the integrity of the firmware of the embedded system 220 according to the embodiment of the present invention may verify the integrity of even an embedded system 220 incapable of accessing the network, by utilizing the communication interface 230.

Further, step S310 may be configured to include a program DB for storing and updating the program.

Next, in the method for verifying the integrity of the firmware of the embedded system 220 according to the embodiment of the present invention, the source integrity code of source firmware is obtained at step S320.

In this case, step S320 may be configured to include a firmware DB for storing and updating the source firmware.

The firmware DB may store and update the source integrity code of the source firmware.

Next, in the method for verifying the integrity of the firmware of the embedded system 220 according to the embodiment of the present invention, it is determined whether the integrity of the firmware of the embedded system is maintained, by using the target integrity code and the source integrity code at step S330.

In this case, step S330 may be configured to compare the target integrity code with the source integrity code, and determine in different manners whether the integrity is maintained depending on whether the target integrity code is found to be identical to the source integrity code as a result of the comparison.

In detail, step S330 may be configured to, if the target integrity code is found to be identical to the source integrity code as a result of the comparison, determine that the integrity is maintained, and if the target integrity code is not found to be identical to the source integrity code as a result of the comparison, determine that the integrity is not maintained.

In this way, the method for verifying the integrity of the firmware of the embedded system 220 according to the embodiment of the present invention may perform integrity verification in such a way as to determine whether the firmware of the embedded system 220 is the latest version and has been forged, by comparing the target integrity code with the source integrity code.

Next, in the method for verifying the integrity of the firmware of the embedded system 220 according to the embodiment of the present invention, information about whether the integrity of the firmware of the embedded system 220 is maintained is displayed on the screen at step S340.

Figure 4:
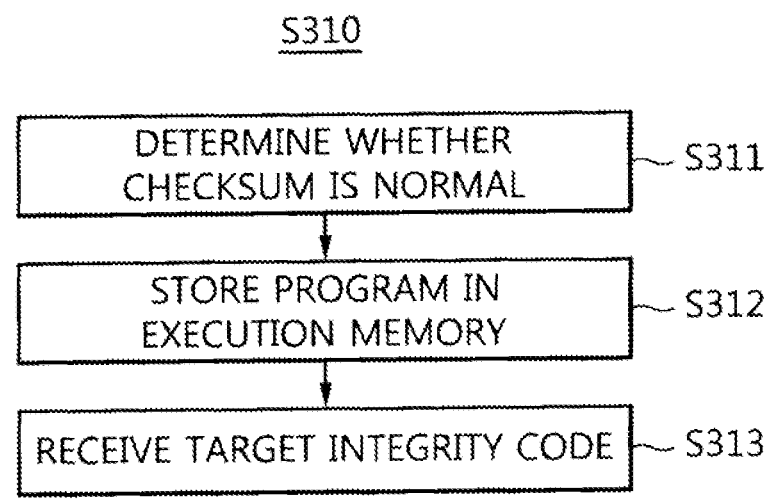
FIG. 4 is an operating flowchart showing a target integrity code obtainment step shown in FIG. 3.

FIG. 4 is an operating flowchart showing the target integrity code obtainment step S310 shown in FIG. 3.

Referring to FIG. 4, at the target integrity code obtainment step S310 shown in FIG. 3, it is determined whether the checksum of a program for calculating an integrity code is normal at step S311.

Here, the checksum may be the sum of all data values of the program.

Further, at the target integrity code obtainment step S310 shown in FIG. 3, the program is stored in the execution memory of the embedded system 220 at step S312.

Next, at the target integrity code obtainment step S310 shown in FIG. 3, the target integrity code calculated by executing the program is received at step S313.

As described above, the method for verifying the integrity of the firmware of the embedded system 220 according to the embodiment of the present invention may store the program in the execution memory, and utilize the target integrity code calculated by executing the program, thus solving the problem of program forgery occurring in a server-client structure, and enabling integrity verification with higher security to be performed.

As described above, the present invention can perform integrity verification in such a way as to determine whether the firmware of an embedded system is the latest version and has been forged, by comparing the integrity code of the embedded system with the integrity code of source firmware.

Further, the present invention can solve the problem of program forgery occurring in a server-client structure and can perform integrity verification with higher security by storing a program for calculating an integrity code in the execution memory of an embedded system and by utilizing the integrity code calculated by executing the program.

Furthermore, the present invention can perform integrity verification even on an embedded system incapable of accessing a network, by utilizing communication interfaces such as a USB, a UART, and the Ethernet.

As described above, in the apparatus and method for verifying the integrity of firmware of an embedded system according to the present invention, the configurations and schemes in the above-described embodiments are not limitedly applied, and some or all of the above embodiments can be selectively combined and configured so that various modifications are possible.

What is claimed is:

1. An apparatus for verifying integrity of firmware of an embedded system, comprising:
   a target integrity code obtainment unit for obtaining a target integrity code of firmware of the embedded system;
   a source integrity code obtainment unit for obtaining a source integrity code of source firmware; and
   an integrity determination unit for determining whether integrity of the firmware of the embedded system is maintained, by using the target integrity code and the source integrity code,
   wherein the target integrity code obtainment unit stores a program for calculating an integrity code in execution memory of the embedded system, and obtains the target integrity code calculated by executing the program,
   wherein the target integrity code obtainment unit determines whether a checksum of the program is normal and stores the program in the execution memory if it is determined that the checksum of the program is normal, and
   wherein the target integrity code obtainment unit comprises a communication interface for transmitting an execution signal for the program to the embedded system and receiving the target integrity code from the embedded system.

2. The apparatus of claim 1, wherein the communication interface comprises one or more of a Universal Serial Bus (USB), a Universal Asynchronous Receiver/Transmitter (UART), and an Ethernet.

3. The apparatus of claim 2, further comprising a screen display unit for displaying information about whether the integrity of the firmware of the embedded system is maintained on a screen.

4. The apparatus of claim 3, wherein:
the target integrity code obtainment unit comprises a program database for storing and updating the program, and
the source integrity code obtainment unit comprises a firmware database for storing and updating the source firmware.

5. The apparatus of claim 4, wherein the firmware database stores and updates the source integrity code of the source firmware.

6. The apparatus of claim 5, wherein the integrity determination unit compares the target integrity code with the source integrity code, and determines in different manners whether the integrity is maintained depending on whether the target integrity code is found to be identical to the source integrity code as a result of the comparison.

7. The apparatus of claim 6, wherein the integrity determination unit determines that the integrity is maintained if the target integrity code is found to be identical to the source integrity code as a result of the comparison, and determines that the integrity is not maintained if the target integrity code is not found to be identical to the source integrity code as a result of the comparison.

8. A method for verifying integrity of firmware of an embedded system, comprising:
obtaining a target integrity code of firmware of the embedded system;
obtaining a source integrity code of source firmware; and
determining whether integrity of the firmware of the embedded system is maintained, by using the target integrity code and the source integrity code,
wherein obtaining the target integrity code is configured to store a program for calculating an integrity code in execution memory of the embedded system, and obtain the target integrity code calculated by executing the program,
wherein obtaining the target integrity code is configured to determine whether a checksum of the program is normal, and store the program in the execution memory if it is determined that the checksum of the program is normal, and
wherein obtaining the target integrity code is configured to comprise a communication interface for transmitting an execution signal for the program to the embedded system and receiving the target integrity code from the embedded system.

9. The method of claim 8, wherein the communication interface comprises one or more of a Universal Serial Bus (USB), a Universal Asynchronous Receiver/Transmitter (UART), and an Ethernet.

10. The method of claim 9, further comprising displaying information about whether the integrity of the firmware of the embedded system is maintained on a screen.

11. The method of claim 10, wherein:
obtaining the target integrity code is configured to comprise a program database for storing and updating the program, and
obtaining the source integrity code is configured to comprise a firmware database for storing and updating the source firmware.

12. The method of claim 11, wherein the firmware database stores and updates the source integrity code of the source firmware.

13. The method of claim 12, wherein determining whether the integrity of the firmware of the embedded system is maintained is configured to compare the target integrity code with the source integrity code, and determine in different manners whether the integrity is maintained depending on whether the target integrity code is found to be identical to the source integrity code as a result of the comparison.

14. The method of claim 13, wherein determining whether the integrity of the firmware of the embedded system is maintained is configured to determine that the integrity is maintained if the target integrity code is found to be identical to the source integrity code as a result of the comparison, and determine that the integrity is not maintained if the target integrity code is not found to be identical to the source integrity code as a result of the comparison.

* * * * *